Jan. 5, 1932.   C. M. VICK   1,839,282
BALL COCK CONTROL AND SILENCER
Filed Sept. 18, 1929   2 Sheets-Sheet 1

Inventor
C. M. Vick
by Hazard and Miller
Attorneys

Jan. 5, 1932.      C. M. VICK      1,839,282

BALL COCK CONTROL AND SILENCER

Filed Sept. 18, 1929      2 Sheets-Sheet 2

Inventor
C. M. Vick
by Hazard and Miller
Attorneys

Patented Jan. 5, 1932

1,839,282

UNITED STATES PATENT OFFICE

CLARENCE M. VICK, OF MONTEREY PARK, CALIFORNIA

BALL COCK CONTROL AND SILENCER

Application filed September 18, 1929. Serial No. 393,469.

My invention pertains to a ball cock control and silencer utilized with a water flushing apparatus such as might be used for flushing toilets.

An object of my invention is a device for controlling the operation of a so-called ball cock, that is a cock or water valve controlling the water supply, in which a ball floats on the surface of the water and drops as the water is discharged from the tank in a flushing operation; the dropping of the ball opening the water cock and again refilling the tank.

With many of the tank type of flushers having ball cocks these shut off gradually, allowing the water to fill the tank at a gradually decreasing rate and are sometimes very noisy, giving a screeching noise when the water is nearly shut off and is flowing into the tank but slowly. A number of these controls as now on the market are objectionable, partly on account of their slow action in refilling the tank and partly on account of the excessive noise made by the flow of water.

An object of my invention is to give a quick flow of water into the tank to fill the tank when it has been emptied on flushing and to maintain this flow at a substantially constant rate and when the tank is filled, to shut the water off quickly but not sufficiently suddenly to give a water hammer.

Another object in this connection is to control the flow of water so that there is a quiet filling of the tank without any noise or screeching other than probably the noise of the water rapidly flowing into the tank, which as a rule is not objectionable and occupies but a short time. An advantage of filling the tank rapidly is that flushing operations may be repeated at short intervals if desired.

Another detailed object of my invention is controlling the ball cock or float operated valve so that such valve is positively locked in an open position in the flushing operation and is maintained locked until the water rises to the usual tank level when the float of the ball cock is released and itself floats on the water surface, thus shutting the ball cock.

A further object of my invention is an auxiliary ball cock control device which may be installed either in flushing tanks now in use or made as a part of new equipment in which an auxiliary or control float is pivotally supported in the tank, preferably on the overflow pipe and this has a latching device operated by the auxiliary float to lock the ball cock in its lower position when the tank is flushed; the water rising raises the secondary float which enlarges the flow of the ball cock and allows this again to close after running the water with the cock wide open until the tank is filled.

My invention is illustrated in the accompanying drawings, in which.

Figure 1:
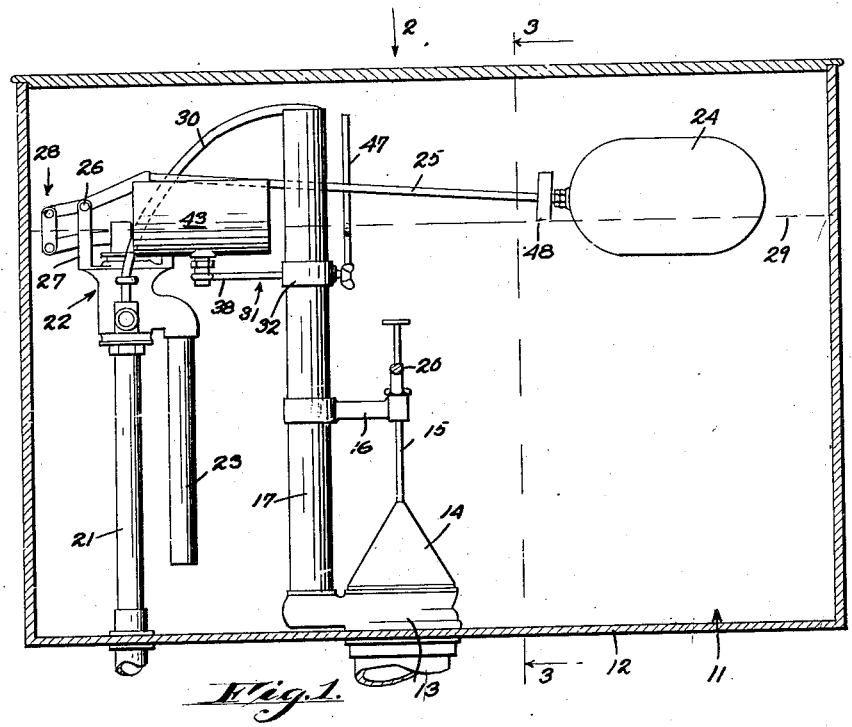
Figure 1 is a section on the line 1—1 of Figs. 2 or 3, taken in the direction of the arrows.
Figure 2:
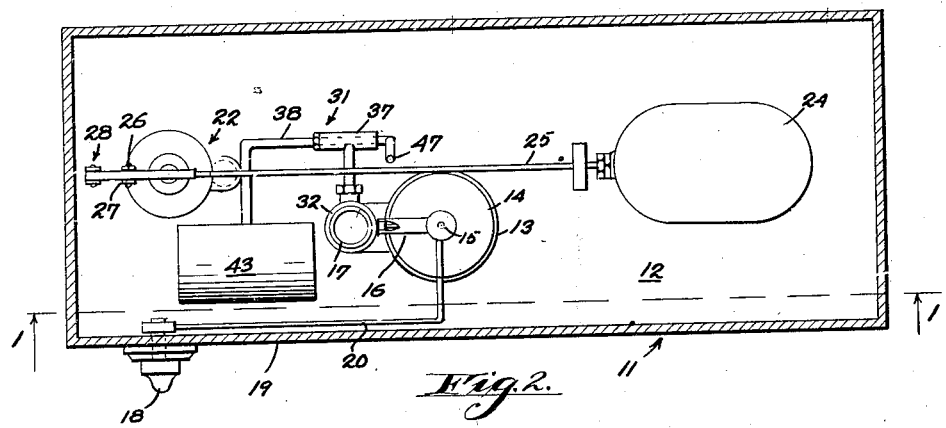
Fig. 2 is a plan of Fig. 1 taken in the direction of the arrow 2 of Fig. 1 with the tank cover removed.

In the drawings, the flushing tank is designated generally be the numeral 11 having a bottom 12 through which extends the usual flushing outlet 13, this having a ball stopper 14 with a stem 15 slidable in a guide 16. Such guide is supported on a stand pipe 17 which carries the overflow from the full tank and from the flushing valve. The tank is illustrated as being flushed by a flushing handle 18 on the front 19 of the tank, this operating through a lifting rod 20 which raises the ball stopper 14.

The water inlet pipe 21 extends upwardly through the tank and has a water cock indicated generally by the numeral 22 at the upper end thereof. The discharge from this cock is through the discharge pipe 23 towards the bottom of the tank. The ball cock is controlled by the float 24 mounted on an arm 25 and pivoted at 26 on the bracket 27. There is a lever and link mechanism 28 which actuates the cock 22 to close this when the tank is at its filled level as indicated by the water level line 29. The water cock has an overflow pipe 30 leading to the stand pipe 17. These features above recited are of more or less standard construction, although in some tanks there is a variation in the construction of the above elements and their arrangement.

Figure 5:
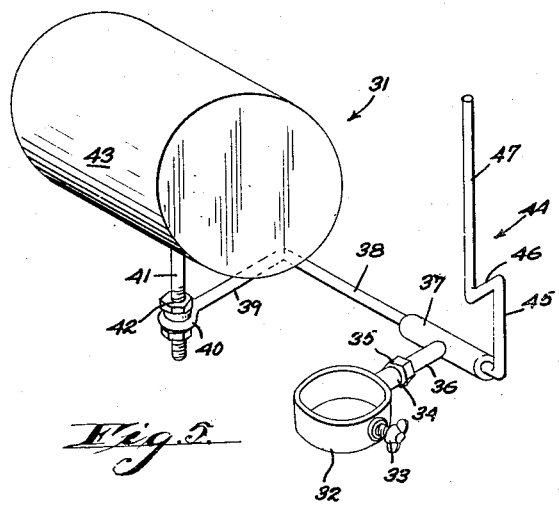
Fig. 5 is a detail perspective view of the auxiliary mechanism installed in the usual tank.

My invention utilizes the auxiliary float and lock mechanism designated generally by the numeral 31 illustrated particularly in Fig. 5. A clamp 32 is utilized which may be slipped over the top of the stand pipe 17 and clamped thereto by a thumb nut 33. This clamp has an arm 34 extending laterally therefrom which arm has preferably a screw threaded coupling connection by the coupling 35 with an extension arm 36, such extension arm having an elongated bearing 37 thereon. In this bearing is journaled a rocking shaft 38 which has an arm 39 connected thereto. This arm is provided with an eye 40 through which extends a stem 41, the stem being adjustably connected through the eye by the adjusting nuts 42. The auxiliary float 43 is mounted on the stem 41. A latching arm 44 is attached to the opposite end of the rock shaft 38. This is illustrated as having a straight section 45, a section 46 at right angles thereto and an end section 47 parallel to the section 45.

The auxiliary mechanism 31 is located in the tank so that when the water is at its high level in the tank and the ball valve shut off with both floats floating, the portion 47 of the latch arm is positioned at one side of the arm 25 carrying the float 24. This arm when the tank is flushed swings downwadly in an arc from the pivot pin 26 and at the same time the auxiliary float 43 descends. As the water flushes out of the tank the section 47 of the latch 44 presses sidewise against the arm 25 and this restrains the tilting action of the latch and the dropping of the auxiliary float 43 as the water descends, this being due to the rigid connection between the latch 44 and the auxiliary float 43 through the rock shaft 38.

Figure 3:
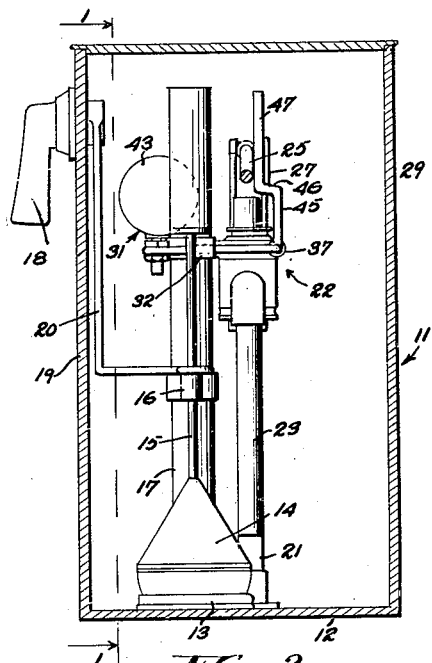
Fig. 3 is a transverse section on the line 3—3 of Fig. 1 in the direction of the arrows, showing the auxiliary control float in its uppermost position.
Figure 4:
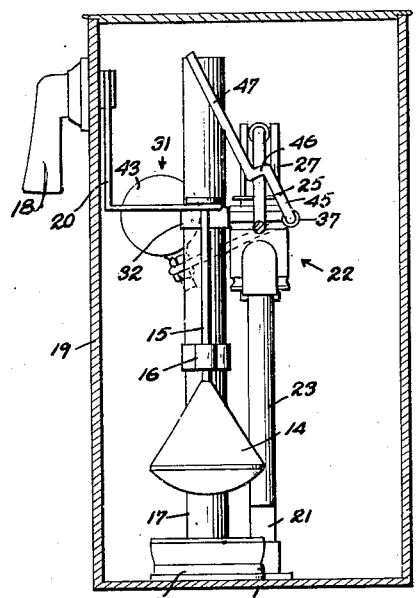
Fig. 4 is a view similar to Fig. 3, showing the auxiliary float in its lowermost position with the ball cock lever locked with the ball cock open.

However, when the tank is empty and the float 24 is dropped to substantially its full extent, the arm 25 passes below the offset section 46 of the latch 44, these different positions being indicated in Figs. 3 and 4, which action allows the further drop of the auxiliary float 43 as the tank is about empty. When the ball stopper 14 closes and the tank begins to fill, the gradual upward movement of the float 24 is prevented by the arm 25 being latched underneath the section 46 of the latch 44. This will be appreciated from the view in Fig. 4. As the main ball cock 22 is thus maintained substantially wide open, the water fills in the tank rapidly, thus giving a quick fill to the tank and as the water approaches its normal level the auxiliary float 43 is floated by the water bringing it from the position of Fig. 4 to the position of Fig. 3, which action swings the latch 44 and unlatches the arm 25 of the float 24 and allows such float to rise to the surface and shut off the ball valve 22.

In order to retard the upward swinging action of the float 24 and the arm 25, I provide an adjusting weight 48 on the arm 25. This prevents too sudden a closing of the ball cock 22 and aids in preventing a water hammer. It will thus be seen that as the tank is filled quickly with the ball valve held substantially wide open and then this is closed quickly, that there will be no slow closing action which often results in a noisy screeching action of the ball valve. Thus the refilling of the tank is substantially noiseless except for the flow of the water and the slight noise made by the slight jar given by the auxiliary and the main floats quickly rising to the surface.

Various changes may be made in the principles of my invention without departing from the spirit thereof as set forth in the description, drawings and claims.

I claim:

1. A flushing tank having an inlet water supply with an inlet valve, a first float having an arm interconnected with said valve to control same, a bearing vertically adjustable in the tank and having a rock shaft mounted therein, a second float connected to the rock shaft, one end of said rock shaft having an upright portion provided with a latch seat adapted to engage said arm to restrain the first float while the water level rises and to release said arm when the water in the tank rises to a predetermined level to allow closing of the valve.

2. A flushing tank having an inlet water supply with an inlet valve, a first float having an arm interconnected with said valve to control same, a bearing vertically adjustable in the tank and having a rock shaft mounted therein, a second float connected to the rock shaft, one end of said rock shaft terminating in an upright arm having a substantially horizontal portion intermediate its ends to form a latch seat adapted to engage said arm to restrain the first float in a lowered position while the water level rises in the tank and to release said arm when the water rises to a predetermined level to allow closing of the valve.

In testimony whereof I have signed my name to this specification.

CLARENCE M. VICK.